(12) United States Patent
Honda et al.

(10) Patent No.: US 7,611,741 B2
(45) Date of Patent: Nov. 3, 2009

(54) METHOD FOR EXTRACTION AND/OR SQUEEZING OF EDIBLE FOOD AND DRINK

(75) Inventors: Takeshi Honda, Koto-ku (JP); Takeshi Imazawa, Odawara (JP); Yasushi Kubota, Odawara (JP); Tadashi Nakatsubo, Odawara (JP)

(73) Assignee: Meiji Dairies Corporaiton, Tokyo (JP)

( * ) Notice: Subject to any disclaimer, the term of this patent is extended or adjusted under 35 U.S.C. 154(b) by 0 days.

(21) Appl. No.: 10/496,984

(22) PCT Filed: Nov. 19, 2002

(86) PCT No.: PCT/JP02/12064

§ 371 (c)(1), (2), (4) Date: May 27, 2004

(87) PCT Pub. No.: WO03/045159

PCT Pub. Date: Jun. 5, 2003

(65) Prior Publication Data

US 2005/0008753 A1 Jan. 13, 2005

(30) Foreign Application Priority Data

Nov. 29, 2001 (JP) .......................... P2001-364348
Apr. 16, 2002 (JP) .......................... 2002-113730

(51) Int. Cl.
A23F 5/00 (2006.01)

(52) U.S. Cl. ................... 426/432; 426/433; 426/594

(58) Field of Classification Search ............ 426/433, 426/597, 594
See application file for complete search history.

(56) References Cited

U.S. PATENT DOCUMENTS

| 3,537,131 A | * | 11/1970 | Kracht et al. ............. 425/4 R |
| 3,682,649 A | | 8/1972 | Orozovich et al. |
| 4,363,264 A | * | 12/1982 | Lang et al. .................. 99/510 |
| 5,275,834 A | | 1/1994 | Thibault et al. |
| H1628 H | * | 1/1997 | Ekanayake et al. .......... 426/597 |
| 5,624,699 A | | 4/1997 | Lang |
| 5,738,003 A | | 4/1998 | Lang |
| 5,780,086 A | * | 7/1998 | Kirksey et al. ............ 426/330.3 |
| 5,902,622 A | | 5/1999 | Owusu-Ansah et al. |

FOREIGN PATENT DOCUMENTS

| DE | 39 07 427 A1 | 9/1990 |
| EP | 0 343 678 A2 | 11/1989 |
| ES | 2159969 T3 | 9/2000 |
| GB | 644483 | 10/1950 |
| GB | 1 161 945 | 8/1969 |
| JP | 62-126935 A | 6/1987 |
| JP | 4-051847 A | 2/1992 |
| JP | 04-330248 A | 11/1992 |
| JP | 06-030703 A | 2/1994 |
| JP | 06-303904 A | 11/1994 |
| JP | 08-056577 A | 3/1996 |
| JP | 10-075750 A | 3/1998 |
| JP | 11-000144 A | 1/1999 |
| JP | 11-075694 A | 3/1999 |
| JP | 11-289984 A | 10/1999 |
| JP | 2000-078946 A | 3/2000 |
| JP | 2000-083587 A | 3/2000 |
| JP | 2000-354455 A | 12/2000 |
| WO | WO 97/16073 A1 | 5/1997 |

OTHER PUBLICATIONS

XP-002319499—Derwent Publications Ltd., (1997)—Abstract.
"Extraction of Theine; Tea Polyphenols and Lipoposlysaccharide of Tea," *Tea in Fujian*, p. 21-22, vol. 2, 1995.
"The Development of Tea Food," *Technique of Small to Medium Enterprises*, p. 8-9, vol. 3, 1999.

* cited by examiner

*Primary Examiner*—Anthony Weier
(74) *Attorney, Agent, or Firm*—Sughrue Mion, PLLC

(57) ABSTRACT

A food objective for extraction and/or squeezing is charged into a colloid mill or a twin-screw extruder; immediately after and/or while milling, a low-temperature solvent (for example, water or milk of from −3 to 50° C.) is added; and after treating the food using the extruder, grounds are removed to produce an extract and/or a squeezed liquid.

3 Claims, No Drawings

METHOD FOR EXTRACTION AND/OR SQUEEZING OF EDIBLE FOOD AND DRINK

TECHNICAL FIELD OF THE INVENTION

The present invention relates to the production of an extract and/or a squeezed liquid and in more detail, to a process of producing an extract and/or a squeezed liquid in which oxidation is suppressed as far as possible, within a short period of time with good efficiency by using an extruder, a colloid mill, or the like. According to the present invention, it is possible to provide a variety of products that have been unable to be industrially produced, such as coffee having excellent flavor by controlled volatilization of aroma and tea based drinks in which a useful tea component suspends, thereby keeping a vivid green color (for example, "tea leaf eating" drinks for taking tea leaves as they are).

BACKGROUND ART

Conventionally, in the case of industrially obtaining a regular coffee extract, a method of extracting a prescribed amount of a milled material of roasted coffee beans with hot water by a closed extraction column, a kneader, a decanter or the like is commonly employed. However, according to the method, the extraction operation must be repeated every batch, and the roasted beans whose surface areas have increased by crushing are quickly oxidized, which results in deterioration in flavor and loss of aroma fragrant components. Also, the coffee extract thus obtained by hot water is inevitable from such a defect that even by allowing it to stand for a short time of from about 15 to 30 minutes, the aroma fragrant components which the roasted coffee beans originally have quickly change in quality and get scattered and lost. If it is intended to suppress this compulsorily, a quick cooling step of the coffee extract with a cooling medium as an auxiliary measure becomes necessary; however, a sufficient effect is not obtained.

In this way, according to the hot water extraction that has been carried out on an industrial scale, miscellaneous tastes such astringency or acrid taste components are inevitable, and these miscellaneous tastes strongly appear with an increase of the extraction efficiency. Accordingly, the low-temperature extraction method is proposed, and coffees that are low in astringency and loss of aroma fragrant components, such as water drip coffee (generally called Dutch coffee), are marketed. However, the water drip system or the like, which is the current extraction method and in which the extraction is carried out while dropping water droplets, requires a long time of from 3 to 8 hours for obtaining an extracted liquid having 1% or more of soluble solids. Accordingly, it is extremely difficult to develop commodities that are industrially profitable, and commodities have hardly been put into practical use.

On the other hand, the extraction of green tea as a representative example of teas will be reviewed. In the case of industrial production, in general, the green tea is produced by extracting a prescribed amount of green tea leaves with hot water of 50° C. or higher for 10 minutes or longer using a kneader, a decanter, etc. and removing the used tea leaves by filtration using a flannel filter bag or by using a centrifuge such as a clarifier. In the green tea, the components to be extracted into warm water vary depending upon the extraction temperature. In general, if the extraction temperature is set up at a low temperature, umami components composed mainly of an amino acid such as L-theanine and glutamic acid and various fragrant components are eluted, and if the extraction is set up at a high temperature, astringency components composed mainly of polyphenol, etc. are eluted in addition to the foregoing components. The astringency components are an important factor for forming the flavor of green tea, but excessive elution thereof produces an undesirable flavor.

In the usual case, taking into consideration the economy, the green tea is generally extracted with hot water of 60° C. or higher in industrial production. However, it is also known that the extraction with hot water produces rapid fading or yellowing of pigments such as green tea chlorophyll, which results in a reduction of the quality of color. For preventing this fading, it is considered that the addition of vitamin C or a sodium salt thereof is effective. However, an effect thereof is restrictive, and the addition of an excess of vitamin C or the like produces undesirable results due to the generation of a vitamin odor. Furthermore, according to the treatment at a high temperature for a long time, fragrance and umami that the green tea leaves possess disappear to no small extent, and dietary fibers are hardly extracted.

Also, industrial tea based drinks represented by those in the conventional PET beverage market are made transparent from the viewpoint of appearance by removing the tea grounds that may possibly cause precipitation as far as possible. Furthermore, in order to compensate the browning by heat, it was devised to make the texture of green tea drinks by wrapping with a green film or the like. In this way, so far as the green tea is extracted with hot water, it is inevitable that fading of the extracted liquid of green tea proceeds, whereby a preferable fragrance inherent to the green tea is rapidly lost. Also, conversely, if low-temperature extraction is chosen, since soluble solids are hardly eluted, the extraction requires a long time, which results in a remarkable reduction of the productivity. Accordingly, it is impossible to apply the usual low-temperature extraction method to the industrial production.

Furthermore, in recent years, useful components that a green tea possesses have been studied. In view of the matter that 70% or more of the useful components remain in the tea leaves, a health method such as "tea leaf eating" of directly eating tea leaves has been recently highlighted.

Development of technologies capable of retaining fragrance and umami of teas as far as possible, dispersing useful components of tea leaves represented by dietary fibers in the uniform state in a container for a long period of time and retaining the original green color to considerable extent has been demanded. However, there is no report of complete success yet.

PROBLEMS TO BE SOLVED BY THE INVENTION

As described above, according to the high-temperature extraction method, deterioration in flavor and quality of the product is inevitable in not only coffee and green tea but also other foods. In contrast, according to the low-temperature extraction method, the extraction and squeezing efficiency are poor, and hence, this method is not industrially applicable. In these conventional methods, it is extremely difficult to crush soluble solids from a single product or a combination of foods that are generally objective for extraction and/or squeezing, such as coffee, green tea, black tea, oolong tea, herb tea, wild grass tea, Chinese medical tea, cocoa, vanilla, fruit, and vegetable, and rapidly extract and/or squeeze them efficiently and continuously with a low-temperature solvent within a short time. Also, in the case of using a solvent containing proteins or lipids such as milk, in order to increase the extraction efficiency, high-temperature extraction must be chosen. In compensation for this, risks in deterioration of the flavor caused due to the heating of proteins, such as coagulation and change in quality of lipids had to be taken.

In these conventional methods, there were encountered decisive problems in both the high-temperature extraction method and the low-temperature extraction method. Under these circumstances, the present invention has been made for the purpose of the development of a new revolutionary method capable of efficiently extracting or squeezing a desirable flavor within a short time.

Also, with respect to the tea based drinks, the conventional tea based drinks of a single product or combination products of foods that are generally objective for extraction, such as green tea, black tea, oolong tea, herb tea, wild grass tea, and Chinese medical tea, were drinks in which insoluble matters are completely removed so that the transparency is very high. Also, among these insoluble matters, it is extremely difficult to suspend fine powders for a long time. Also, as described above, even in the production of tea based drinks, risks such as browning and deterioration in flavor had to be taken by the long-term extraction with hot water at 50° C. or higher for 10 minutes or more from the viewpoint of economy and the viewpoint of elution of useful components.

METHOD TO SOLVE THE PROBLEMS

In order to achieve the above-mentioned objects, the present invention has been made. The inventors of the present invention made investigations from various directions. As a result, they have obtained a number of novel useful findings for the first time that by employing a novel constitution of extruder treatment using a twin-screw extruder by the addition of a solvent of low temperature but not high temperature for the first time, it is possible to produce an extracted liquid of coffee, etc. and/or a squeezed liquid of juice, etc., which is free from acridity, astringency and other miscellaneous tastes and has excellent flavor, with good efficiency within a short time; that the kind of the solvent can be substituted with one other than water, such as milk, and in that case, it is possible to efficiently produce coffee with milk and a wide variety of other products according to a solvent to be used through an extremely simple operation; and that it is possible to produce even products that have been unknown depending upon a solvent to be used or a food objective for the treatment.

The present invention has been finally completed based on these useful novel findings and as a result of further investigations. The present invention will be described below in detail.

In carrying out the present invention, a food objective for the treatment is treated using a twin-screw extruder. That is, in a twin-screw extruder, an objective food dispersion liquid is passed through a narrow gap between two rotating screws and continuously subjected to at least one of shearing, kneading and emulsification, thereby carrying out extraction and/or squeezing into a solvent by the action. As an actual apparatus, commercially available apparatuses can be properly used. Also, besides the twin-screw extruder, any apparatus can be employed so far as it is a continuous kneading apparatus equipped with twin screws and having an analogous action thereto (for example, a continuous kneader KRC, manufactured by Kurimoto, Ltd.). Accordingly, since a colloid mill represented by a masscolloider is a crushing apparatus having a narrow gap, it can be employed in the present invention as the twin-screw extruder or the like. The present invention will be described below with reference to the twin-screw extruder as a representative example.

In the present invention, a food objective for the treatment is treated by a twin-screw extruder (including the above-mentioned continuous kneading machine). In this regard, it is necessary that the food is charged, and immediately after and/or while milling, a solvent, especially a low-temperature solvent is added, thereby carrying out extruder treatment. In this way, by the extruder treatment under low temperature conditions, it is possible to efficiently conduct extraction and/or squeezing within an extremely short time while suppressing the formation of miscellaneous tastes, keeping the quality of useful components and suppressing the oxidation.

In this way, after extraction and/or squeezing, extraction grounds and/or squeezing grounds are removed by a common method (for example, centrifugation, filtration, and decantation), to obtain a desired extract and/or squeezed liquid (juice). Also, in the case of vegetable juice or fruit juice, if it is desired to utilize fibrous pulps, it is not necessary to completely separate the grounds, but the separation of grounds itself may not be carried out in some cases. Also, in the case of tea based drinks of a type of suspending or emulsifying useful components of tea leaves, only the used tea leaves can be separated and removed.

The separation of the grounds is carried out by a common method as described above. Specifically, for example, a nozzle or a slit-like fitment is installed in a die as an outlet of the extruder, to perform solid-liquid separation, or filtration with a filter, liquid cyclone, clarifier, decanter, or the like can be utilized.

In the present invention, the extruder treatment is carried out using a low-temperature solvent under low temperature conditions, and low-temperature solvents of lower than 60° C., preferably 55° C. or less, and more preferably 50° C. or less are used. With respect to the lower limit of the low temperature, a temperature at which the solvent is not frozen is employable. Although the lower limit varies depending on the kind of the solvent, it is −5° C. or higher, and usually −3° C. or higher. Specifically, a low temperature region of from 5 to 50° C. is shown in the Examples, and conditions at a low temperature region of from 2 to 30° C. are preferable. If necessary, a cooling unit may be provided in the extruder.

As the solvent, beside water and milk, a variety of solvents described below as examples can be used over a wide range. Examples thereof include dairy products (for example, raw milk, skim milk, whey, sour milk, reduced whole milk powder, reduced skim milk powder, or the like); liquids containing one or more kinds of sugar-containing liquids (for example, glucose, fructose, sucrose, lactose, maltose, trehalose, raffinose, lactulose, melibiose, lacto-oligosaccharide, galacto-oligosaccharide, and soybean-oligosaccharide), isomerized sugars, liquid sugars, and the like; sugar alcohol-containing liquids (for example, liquids containing one or more kinds of erythritol, xylitol, maltitol, sorbitol, and other various sugar alcohols); liquids containing a mineral such as calcium, magnesium, sodium, and potassium; liquids containing a vitamin such as vitamins A, B, C, D and E; liquid containing a stabilizer such as pectin and carboxymethyl cellulose; and emulsifiers in the case of using fat-soluble components, bacteriostatic agents (for example, sucrose fatty acid esters and polyglycerin fatty acid esters), pH adjustors (for example, sodium bicarbonate), flavors, pigments, antioxidants (for example, vitamin C and its sodium salt), sweeteners (for example, in addition to the above-mentioned sugars, stevia and honey), taste agents (for example, nucleic acids and amino acids), and others.

These solvents may be used singly or in admixture of two or more thereof. If desired, the above-mentioned respective components themselves may be directly added to various solvents such as water and milk without being formed into a solution.

In the present invention, by using above-mentioned method, an extract and/or a squeezed liquid, in which deterioration in flavor or quality is prevented, is obtained by subjecting various foods to low-temperature extruder treatment. Examples of the objective foods include one or more kinds of coffee, green tea, black tea, Chinese teas (for example, oolong tea, puer tea, and tekkannon tea), herb tea, wild grass tea, Chinese medical tea, cocoa, vanilla, fruit, and vegetable.

Embodiments of the process of producing an extract and/or a squeezed liquid by low-temperature extruder treatment according to the present invention are described as follows.

EMBODIMENT 1

A process for producing an extract and/or a squeezed liquid having extremely high extraction or squeezing efficiency and having a novel flavor, which comprises charging a single product or a combination of foods that are generally objective for extraction and/or squeezing, such as coffee, green tea, black tea, oolong tea, herb tea, wild grass tea, Chinese medical tea, cocoa, vanilla, fruit, and vegetable, in a twin-screw extruder; adding an appropriate solvent such as water and milk immediately after or while milling; subjecting the mixture to shearing, kneading and emulsification within the extruder system, thereby extracting or squeezing useful components of the food into the solvent; and then removing extraction grounds or squeezing grounds by any method.

EMBODIMENT 2

The process for producing an extract and/or a squeezed liquid according to Embodiment 1, wherein the twin-screw extruder is an apparatus for passing an objective food dispersion liquid through a narrow gap between two screws generally rotating in the same direction and continuously subjecting it to shearing, kneading and emulsification, thereby carrying out extraction and/or squeezing into a solvent by the physical action.

EMBODIMENT 3

The process for producing an extract and/or a squeezed liquid according to Embodiment 1 or Embodiment 2, wherein after milling the objective food by the twin-screw extruder, extraction and/or squeezing is extremely rapidly carried out within a series of actions, thereby suppressing oxidation leading to deterioration of the flavor after milling as far as possible.

EMBODIMENT 4

The process for producing an extract and/or a squeezed liquid according to Embodiment 1, Embodiment 2, or Embodiment 3, wherein the solution to be used for the extraction and/or squeezing, such as water and milk, is of a low temperature of from −3 to 50° C. and is clearly different from a temperature region of usual hot water extraction and/or squeezing of foods.

EMBODIMENT 5

The process for producing an extracted liquid according to Embodiment 1, Embodiment 2, or Embodiment 3, wherein the solvent to be used for extraction of coffee, such as water and milk, is of a low temperature of from −3 to 50° C. and is clearly different from a temperature region of usual hot water extraction of coffee as high as approximately 90° C.

EMBODIMENT 6

The process for producing an extracted liquid and/or a squeezed liquid according to Embodiment 1, Embodiment 2, or Embodiment 3, wherein the solvent to be used for extraction of teas, such as water and milk, is of a low temperature of from −3 to 50° C. and is clearly different from a temperature region of usual hot water extraction of teas of from about 60 to 95° C.

EMBODIMENT 7

The process for producing a squeezed liquid according to Embodiment 1, Embodiment 2, or Embodiment 3, wherein the solvent to be used for squeezing vegetables, such as water and milk, is of a low temperature of from −3 to 50° C., and the squeezing treatment capable of making elution of oleophilic components or the like easy by the emulsification action or the like in the case of using a solvent is clearly different from usual squeezing treatment of foods in a high temperature region of 60° C. or higher.

EMBODIMENT 8

A production process using a continuous kneading apparatus equipped with twin screws and having an effect analogous to a twin-screw extruder, or the like.

EMBODIMENT 9

A production process using a crushing apparatus having a narrow gap such as a colloid mill represented by a masscolloider.

EMBODIMENT 10

The process according to any one of Embodiments 1 to 4, which comprises finely milling at least one of green tea, black tea, oolong tea, puer tea, tekkannon tea, herb tea, wild grass tea, and Chinese medical tea as a food objective for extraction using the apparatus at a low temperature of not higher than 50° C.; while and/or immediately after milling, extracting the tea with a low-temperature solvent kept at the low temperature; and then removing the precipitated tea grounds.

In producing a coffee according to the present invention, for example, the extruder treatment may be carried out in the following manner.

That is, roasted coffee beans are charged in a twin-screw extruder or a continuous kneading apparatus equipped with twin screws and having an effect analogous thereto, or the like; immediately after or while milling, an appropriate solvent such as water and milk is added; the mixture is subjected to shearing, kneading and emulsification within the extruder system, thereby extracting useful components of coffee into the solvent; and extraction grounds are then removed by any method to obtain an extracted liquid.

The conventional extraction method using low-temperature water of from about −3 to 50° C. by a drip system or the like required from 3 to 8 hours for obtaining 1% or more of soluble solids and was a batchwise treatment method. Furthermore, according to the conventional extraction method, in the case of using dairy components such as low-temperature milk, fresh cream, and skim milk powder as the solvent, the elution of soluble solids was extremely difficult, and hence, the extraction had to be carried out at about 50° C. or higher. Thus, coagulation of milk proteins due to heating or oxidation or change in quality of milk fats was consequently brought.

According to the present method, by treating roasted coffee beans with water of about 20° C. in a twin-screw extruder or a continuous kneading apparatus equipped with twin screws and having an effect analogous thereof, or the like, it is possible to obtain an extraction efficiency of from about 20 to 30% likewise the usual case where the ground roasted coffee beans are extracted with hot water. Also, even in the case of treatment with a solvent such as milk of not higher than 10° C., it is possible to extract the coffee components as in the water extraction, and furthermore, it is possible to obtain an extracted liquid having a high novelty, which is free from coagulation of milk proteins or oxidation or change in quality of milk fats and rich in oleophilic components of coffee.

However, the high-temperature extraction method involves such defects that deterioration in flavor is brought due to oxidation of coffee oil depending upon the condition and that in general, by allowing to stand for from about 15 to 30 minutes, the aroma fragrant components of coffee quickly get scattered and lost.

Since a coffee extract treated in a twin-screw extruder or a continuous kneading apparatus equipped with twin screws and having an effect analogous thereto, or the like contains fine extraction grounds, it is necessary to separate and remove the fine extraction grounds by any method. In the present invention, the method is not regulated, and as the general separation and removal method, a nozzle or a slit-like fitment is installed in a die as an outlet of the extruder, thereby performing solid-liquid separation, or filtration with a filter, liquid cyclone, clarifier, decanter, or the like can be employed.

Good results are obtained when the temperature of the solvent to be used in the present invention is lower than 60° C., and preferably not higher than 50° C. When the temperature of the solvent exceeds 50° C., especially becomes 60° C. or higher, scattering and loss of aroma fragrant components of coffee and leakage of astringency components such as tannin are recognized as in the case of extraction with hot water (milk), and an effect thereof is limited.

On the other hand, the tea based drinks in the present invention are obtained by passing tea leaves through a narrow gap of a colloid mill represented by a masscolloider or a twin-screw extruder, or the like preferably at a low temperature of not higher than 50° C. to mill the tea leaves; immediately after or while milling, adding an appropriate solvent such as water and milk; subjecting the mixture to shearing or kneading within the apparatus, thereby extracting effective components of the tea into the solvent; and then removing the precipitated tea grounds by any method. The method is a treatment method in which milling and extraction are carried out within a series of actions and very rapidly within several tens seconds. The thus obtained fine powder has an original color tone of each tea and has high fragrance and strong original umami of the tea. Also, the content of dietary fibers is high as compared with the conventional extracted liquids. Furthermore, the fine powder suspends and is dispersed over a long period of time of 3 months or longer and can stably keep the texture as a commodity in transparent containers such a PET bottle container.

In the case of the thus produced green tea, an extremely high extraction efficiency is obtained as in the case of coffee, and the extracted liquid exhibits a beautiful greenish turbid color, which is not obtained using warm water. Also, with respect to the flavor, the extracted liquid has such a characteristic that it is almost free from astringency and miscellaneous tastes and has a mild aftertaste and exhibits a quality characteristic that is reversed to the common knowledge. In particular, in the case of using milk, that trend is strengthened, and an enhancement in degree of elution of the fragrance or umami components is recognized.

Also, in the case of fruits or vegetables, not only the color tone is beautiful, but also in milling fibers, especially in using milk or the like as the solvent, an enhancement in degree of elution of the effective components by emulsification and an enhancement in maintenance of mild flavor or fragrant components are recognized.

In the light of the above, according to the present invention, it is possible to largely increase an efficiency of extraction and/or squeezing of a single product or a combination of coffee, green tea, black tea, oolong tea, herb tea, wild grass tea, Chinese medical tea, cocoa, vanilla, fruit, and vegetable in a low temperature region of from −5 to 60° C., and preferably from −3 to 50° C. Also, the resulting extracted liquid and squeezed liquid each has a quality characteristic having an extremely high value for use.

The thus obtained extracted liquid, squeezed liquid and tea based drinks according to the present invention can be provided as a product as they are or after charging in a container. If desired, various raw materials or components described above, such as sweeteners of sugars, stevia, and honey; pH adjusters such as sodium bicarbonate; antioxidants such as vitamin C and sodium salts thereof; taste agents such as nucleic acids and amino acids; and others described for the preparation of a solvent may be added to form products. Also, the extracted liquid, squeezed liquid and tea based drinks may be used as a raw material for a variety of products without being provided as a final product.

EXAMPLES

The present invention will be described below with reference to the following Example, but it should not be construed that the present invention is limited thereto.

Example 1

Using KEX-50 (manufactured by Kurimoto, Ltd.) as a twin-screw extruder, a 12-mm paddle screw was installed in each of second, third and fourth barrel sections, and a 16 mm-pitch reverse screw was installed immediately after the downstream section of the paddle screw of each of the third and fourth barrel sections, thereby enhancing a kneading ability. Also, the number of rotation of the screw was set up at 220 rpm, and the barrel temperature was set up at 20° C.

Coffee beans grown in Colombia, which had been roasted so as to have an L-value of 21, were used as coffee beans and charged from a first barrel section of the twin-screw extruder at a rate of 4.2 kg/h using a vibration feeder. The roasted beans were forcedly sent into a narrow gap and milled by the rotation of the screws.

Thereafter, water at 20° C. was added at a rate of 38.6 kg/h from the second barrel section, and the ground roasted coffee beans were sheared, kneaded and emulsified. The extracted liquid was extruded from a die outlet for a time of from about 20 seconds to 1 minute 30 seconds and made stationary within about 3 minutes. The resulting extracted liquid was subjected to centrifugation at 750 G for 10 minutes. The amount of a supernatant and precipitate were measured, and the soluble solids content of the supernatant was measured by a saccharimeter.

Also, as hot water extraction by an extruder, the temperature of each barrel was raised to 60° C., 80° C. or 150° C., water at 20° C. was added at a rate of 33.6 kg/h from the second barrel, and the ground roasted coffee beans were sheared, kneaded and emulsificated. In this regard, the temperature of the extracted liquid at the die outlet was 50° C., 60° C. or 95° C.

In addition, milk at 5° C. was added at a rate of 33.6 kg/h from the second barrel section, and the ground roasted coffee beans were sheared, kneaded and emulsificated in the same manner, followed by centrifugation to prepare a sample.

As controls, 1 part of roasted coffee beans having a mean particle size of 400 µm immediately after milling using a granulator was subjected to dropping extraction in a water drip system for 8 hours by dropping 9 parts of water at 20° C. step by step. Also, 1 part of roasted coffee beans immediately after milling was extracted with 9 parts of hot water at 95° C. in a paper drip system, to prepare a sample. Furthermore, after milling using a granulator, the roasted coffee beans was allowed to stand at 25° C. for 12 hours and then extracted with hot water at 95° C. to prepare a sample. Incidentally, the comparison of flavor was carried out with respect to a sample in which the soluble solids content was adjusted to be 1.0% by a panel of five experts.

The thus prepared samples are summarized and shown below.

(Control)
  a: Extracted with water at 20° C.
  b: Extracted with hot water at 95° C.
  c: Extracted with hot water at 95° C. (allowed to stand for 12 hours after milling)
  d: Extracted with hot water at 60° C. using extruder
  e: Extracted with hot water at 95° C. using extruder (The Present Invention)
  f: Extracted with water at 20° C. using extruder
  g: Extracted with water at 50° C. using extruder
  h: Extracted with milk at 5° C. using extruder The test results are shown in Table 1 below. The evaluation items are as follows.
  A: Extraction efficiency (%)
  B: Flavorous characteristic (at the time of preparation of a sample having a soluble solids content of coffee of 1%)
    B1: Fragrance
    B2: Bitter taste
    B3: Sour taste
    B4: Miscellaneous tastes
    B5: Overall evaluation
  C: Tannin amount per soluble solids content of coffee (mg/g)

Incidentally, note 1): in the milk extracted liquid according the method of the present invention, since an error in the measurement of the soluble solids content by a viscometer after centrifugation is large, the evaluation results are not shown; and note 2): the sensory evaluation was carried out by 5-grade absolute evaluation (1: weak/bad to 5: strong/good) according to the scoring method by the panel of five experts, and mean values were defined as a score.

TABLE 1

|   | A  | B1  | B2  | B3  | B4  | B5  | C  |
|---|----|-----|-----|-----|-----|-----|----|
| a | 18 | 3.4 | 2.0 | 1.4 | 2.0 | 3.4 | 66 |
| b | 29 | 2.8 | 3.4 | 2.8 | 3.4 | 3.4 | 78 |
| c | 29 | 2.4 | 3.6 | 3.4 | 3.4 | 3.0 | 75 |
| d | 29 | 3.0 | 3.0 | 2.8 | 3.4 | 3.2 | 80 |
| e | 29 | 2.8 | 3.2 | 3.0 | 3.6 | 3.2 | 92 |
| f | 28 | 4.0 | 2.2 | 1.2 | 1.6 | 4.0 | 65 |
| g | 28 | 3.8 | 2.4 | 1.4 | 1.8 | 3.8 | 68 |
| h | —  | 4.2 | 3.4 | 1.2 | 2.0 | 4.2 | —  |

As is clear from the above-mentioned results, the water extracted samples by the twin-screw extruder treatment exhibit a high extraction efficiency equivalent to that in the hot water drip extraction and have a flavor as in water drip coffee having a high fragrance and a refresh taste low in sour and miscellaneous tastes with respect to the sensory evaluation. On the other hand, in the case where the twin-screw extruder treatment using hot water at 60° C. or higher was carried out, a deteriorating odor accompanied with oxidation of coffee oil was recognized, and sour and miscellaneous tastes increased. Also, in the water extraction, the tannin amount leading to miscellaneous tastes such as astringency was small as compared with the hot water extraction, and especially, it was confirmed that the tannin amount was about 30% smaller than that in the extraction with hot water at 95° C. in the twin-screw extruder. It can be estimated that this result supports the sensory evaluation.

On the other hand, the sample resulting from the extraction with milk using a twin-screw extruder was a coffee extract having a very novel flavor such that the fragrance and bitter taste as coffee flavor are strong and that a sour taste is small.

In addition, as the results of supporting usefulness of the water extraction method by a twin-screw extruder according to the present invention, analysis results of the fragrant components by GC/MS (gas chromatography mass spectrometry). The HS/TCT (head space/thermal-desorption cold trap injection) method was employed as the GC/MS measurement. Specifically, 100 mL of each sample was taken in an eggplant type flask, and a head space in the flask was purged for 10 minutes while heating at about 40° C., to extract easily volatile odoriferous components of the sample, which were then analyzed by GC/MS (kind: GC/MS5973, manufactured by Agrilent Technologies; column: CP-WAX, manufactured by GL Science). As the samples, the extracted liquid (f) with water at 20° C. using an extruder according to the method of the present invention, and the extracted liquid (a) with water at 20° C. and the extracted liquid (b) with hot water at 95° C. as controls were analyzed. With respect to the detected fragrant components, the total peak area in each of the first period (one minute or longer and shorter than 10 minutes) wherein light components are detected, the second period (10 minutes or longer and shorter than 20 minutes) and the third period (20 minutes or longer) wherein heavy components are detected within the elution time (RT) of 34 minutes in total was relatively compared.

TABLE 2

| Relative comparison of peak area | Extracted with water at 20° C. | Extracted with hot water at 95° C. | Extracted with water at 20° C. using extruder |
|---|---|---|---|
| RT: One minute or longer and shorter than 10 minutes | 28% | 22% | 29% |
| RT: 10 minutes or longer and shorter than 20 minutes | 43% | 22% | 20% |
| RT: 20 minutes or longer | 29% | 56% | 51% |
| Total | 100% | 100% | 100% |

As shown in Table 2, it is exhibited that the extracted liquid with water at 20° C. is large in the elution pattern of relatively light components and has a large amount of the fragrant components having a top note. Also, it is exhibited that the extracted liquid with hot water at 95° C. is large in the elution pattern of heavy components of 20 minutes or longer and has a large amount of the fragrant components having a body feeling. On the other hand, the extracted liquid with water at 20° C. using an extruder according to the present invention exhibits a specific elution pattern having the both characteristics, and it can be guessed that the present invention is concerned with a novel extraction method.

Example 2

With respect to both extraction using an extruder and extraction by water soaking, an experiment regarding the extraction efficiency of green tea was carried out. Green tea (Yabukita, sencha grown in Shizuoka Prefecture) was added at a rate of 3.2 kg/h from a first barrel section of a twin-screw extruder by a feeder, and deionized water was added at a rate of 96.8 kg/h from a second barrel section in such a manner that the ratio of water to tea leaves was 30/1. KEX-50 was used as the twin-screw extruder, and the screw pattern was set up in the same manner as in Example 1 such that the number of rotation of the screw was 220 rpm and that the barrel set-up temperature was 20° C. The extraction was carried out by setting up the temperature of deionized water at 5 levels of from 5° C. to 80° C. Thereafter, the extracted liquid was subjected to centrifugation at 750 G for 10 minutes, and precipitated tea grounds were removed.

Also, as controls, with respect to the extraction by water soaking, 30 parts of deionized water was added to 1 part of green tea, and after allowing the mixture to stand at 60° C. for 18 minutes, it was centrifuged at 750 G for 10 minutes. In addition, similar green tea (Yabukita, sencha grown in Shizuoka Prefecture) was milled into a particle size of from about 1 to 20 μm using a grinder and extracted by soaking in water at 20, 40 or 60° C., followed by centrifugation at 750 G for 10 minutes.

The results (Brix value) of the foregoing extraction experiment are summarized and shown below.

TABLE 3

Results of extraction experiment (Brix value)

| Holding time (min) | | 0.73 | 18 | 60 | 120 | 180 |
|---|---|---|---|---|---|---|
| Control: | | | | | | |
| Unmilled tea used | Extracted at 60° C. | — | 0.93 | — | — | — |
| Milled tea used | Extracted at 20° C. | — | 0.59 | 0.80 | 0.92 | 1.10 |
| | Extracted at 40° C. | — | 0.73 | 1.00 | 1.22 | 1.26 |
| | Extracted at 60° C. | — | 0.94 | 1.14 | 1.25 | 1.37 |
| Extraction using extruder | Extracted at 20° C. | 0.90 | — | — | — | — |
| | Extracted at 40° C. | 0.97 | — | — | — | — |
| | Extracted at 60° C. | 0.98 | — | — | — | — |
| | Extracted at 80° C. | 1.22 | — | — | — | — |

(Note)
The holding time of the extraction using an extruder means an average retention time within the system.

It is to be specially mentioned that in order to obtain the extraction Brix equivalent to that in the extraction at 20° C. using an extruder, the extraction of milled tea leaves at 20° C. by soaking required 120 minutes, and it was estimated that in the case of the treatment at 40° C., holding for about one hour is required.

Accordingly, in the present invention, with regard to the extraction by milling using a twin-screw extruder, due to the kneading effect within the system, regardless of the presence or absence of tea leaves grinding at a low temperature of lower than 60° C., it was confirmed that the method of the invention is an epoch-making method for rapidly increasing the extraction efficiency, compared with the conventional extraction method by soaking.

Example 3

Green tea (Yabukita, sencha grown in Shizuoka Prefecture) was added at a rate of 1.2 kg/h from a first barrel section by a vibration feeder, and deionized water at 20° C. was added at a rate of 36.0 kg/h from a second barrel. KEX-50 was used as a twin-screw extruder, and the screw pattern was set up in the same manner as in Example 1 such that the number of rotation of the screw was 220 rpm and that the barrel set-up temperature was 20° C. The resulting extract was centrifuged at 750 G for 10 minutes. The amount of a supernatant and the amount of a precipitate were measured, and the soluble solids content thereof was measured by a saccharimeter.

In addition, milk at 5° C. was added at a rate of 36.0 kg/h from the second barrel section, and the green tea was sheared, kneaded and emulsificated in the same manner as described above, followed by centrifugation to prepare a sample.

As controls, 30 parts of deionized water at 20° C. was added to 1 part of green tea, and after allowing the mixture to stand for one hour, it was subjected to centrifugation at 750 G for 10 minutes. Also, a sample was prepared in the same manner by using deionized water at 65° C. in the same bath ratio, allowing the mixture to stand for 18 minutes, and then centrifuged at 750 G for 10 minutes. Incidentally, the flavor comparison was carried out with respect to a sample as prepared so as to have a soluble solids content of 0.3% by a panel of five experts.

That is, the thus prepared samples are summarized and shown as follows.

(Control)
(a): Extracted with deionized water at 20° C.
(b): Extracted with deionized water at 65° C.

(The Present Invention)
(c): Extracted with deionized water at 20° C. using extruder
(d): Extracted with milk at 5° C. using extruder The test results are shown in Table 3 below. The measurement items are as follows.
a: Extraction efficiency (%)
b: Color tone
c: Flavorous characteristic (at the time of preparation of a sample having a soluble solids content of coffee of 0.3%)
c1: Fragrance
c2: Bitter taste
c3: Sour taste
c4: Miscellaneous tastes
c5: Overall evaluation Incidentally, note 1): in the milk extracted liquid according the method of the present invention, since an error in the measurement of the soluble solids content by the saccharimeter after centrifugation is large, the evaluation results are not shown; and note 2): the sensory evaluation was carried out by 5-grade absolute evaluation (1: weak/bad to 5: strong/good) according to the scoring method by the panel of five experts, and mean values were defined as a score.

TABLE 4

|     | a  | b                              | c1  | c2  | c3  | c4  | c5  |
| --- | -- | ------------------------------ | --- | --- | --- | --- | --- |
| (a) | 8  | Transparent and green          | 3.4 | 2.8 | 2.0 | 1.8 | 3.4 |
| (b) | 25 | Transparent and yellowish green| 2.6 | 2.0 | 3.0 | 3.6 | 3.4 |
| (c) | 20 | Greenish turbid                | 3.8 | 3.2 | 2.0 | 1.6 | 4.0 |
| (d) | —  | —                              | 3.8 | 3.4 | 2.0 | 1.6 | 4.2 |

As is clear from the above-mentioned results, the extraction efficiency of the treatment with deionized water at 20° C. using a twin-screw extruder exhibits a high value as about 20% nevertheless the ordinary-temperature extraction, and the extraction is continuously completed within an extraction time of several tens seconds. Also, the color tone was a specific turbid color due to the elution of the green components, and umami and fragrance inherent to green tea were strong. This trend was further strengthened in the case of the extraction with milk using an extruder and was very novel and unprecedented.

Example 4

Using KEX-50 (manufactured by Kurimoto, Ltd.) as a twin-screw extruder, a 12-mm paddle screw was installed in each of second, third and fourth barrel sections, and a 16 mm-pitch reverse screw was installed immediately after the downstream section of the paddle screw of each of the third and fourth barrel sections, thereby enhancing a kneading ability. Also, the number of rotation of the screw was set up at 220 rpm.

Green tea (Yabukita, sencha grown in Shizuoka Prefecture) was added at a rate of 3.2 kg/h from the first barrel section by a feeder, and deionized water was added at a rate of 96.8 kg/h from the second barrel section in such a manner that the ratio of water to tea leaves was 30/1. The extraction was carried out by setting up the temperature of deionized water at 5 levels of from 5° C. to 80° C. Thereafter, the extracted liquid was centrifuged at 750 G for 10 minutes, and precipitated tea grounds were removed.

Also, as control experiments, 30 parts of deionized water was added to 1 part of green tea, and after allowing the mixture to stand at 60° C. for 18 minutes, it was centrifuged at 750 G for 10 minutes.

Each of the extracted liquids was adjusted with deionized water so as to have a soluble solids content of 0.3% and then subjected to sensory evaluation by a panel of five experts and measured for solids content, nitrogen content, tannin content, transmittance at a wavelength of 660 nm and color tone (a spectral color difference meter for juice, Color Analyzer TC-1800J, manufactured by Tokyo Denshoku Co., Ltd.). The obtained results are shown in Table 5, Table 6 and Table 7, respectively. In Table 5 (flavorous characteristic), the sensory evaluation was carried out by 5-grade absolute evaluation (1: weak/bad to 5: strong/good) according to the scoring method by the panel of five experts, and mean values were defined as a score. Also, in Table 6, the analyzed values of the samples are values adjusted at Brix of 0.3°; and in Table 7 (color tone), the values of color difference are [L-value=+(bright) to−(dark)], [a-value=+(red) to−(green)], and [b-value=+(yellow) to−(blue)].

TABLE 5

|  | Fragrance | Umami | Astringency | Miscellaneous tastes | Overall evaluation |
| --- | --- | --- | --- | --- | --- |
| Control |  |  |  |  |  |
| Extracted at 60° C. | 2.6 | 1.8 | 3.4 | 3.0 | 3.0 |
| Extracted at 60° C. using extruder | 2.6 | 3.0 | 3.2 | 3.0 | 3.6 |
| Extracted at 80° C. using extruder | 2.6 | 3.0 | 3.2 | 3.0 | 3.2 |
| Product of the present invention |  |  |  |  |  |
| Extracted at 5° C. using extruder | 3.0 | 3.2 | 1.2 | 2.0 | 4.0 |
| Extracted at 20° C. using extruder | 3.0 | 3.2 | 1.2 | 2.4 | 4.0 |
| Extracted at 40° C. using extruder | 2.8 | 3.0 | 2.8 | 2.4 | 3.8 |

TABLE 6

|  | Solids content (%) | Nitrogen content (%) | Tannin content (mg %) | Transmittance at 660 nm (%) |
| --- | --- | --- | --- | --- |
| Control |  |  |  |  |
| Extracted at 60° C. | 0.28 | 8.5 | 87.3 | 92.52 |
| Extracted at 60° C. using extruder | 0.33 | 9.2 | 81.6 | 60.33 |
| Extracted at 80° C. using extruder | 0.34 | 9.3 | 81.6 | 59.55 |
| Product of the present invention |  |  |  |  |
| Extracted at 5° C. using extruder | 0.32 | 9.2 | 76.3 | 66.80 |
| Extracted at 20° C. using extruder | 0.33 | 9.3 | 76.0 | 65.37 |
| Extracted at 40° C. using extruder | 0.32 | 9.0 | 77.8 | 63.42 |

TABLE 7

|  | L-value | a-value | b-value |
| --- | --- | --- | --- |
| Control |  |  |  |
| Extracted at 60° C. | 89.18 | 2.89 | 28.80 |
| Extracted at 60° C. using extruder | 83.18 | −0.52 | 37.72 |
| Extracted at 80° C. using extruder | 82.98 | −0.35 | 38.36 |
| Product of the present |  |  |  |

TABLE 7-continued

|  | L-value | a-value | b-value |
|---|---|---|---|
| invention |  |  |  |
| Extracted at 5° C. using extruder | 84.46 | −0.62 | 36.00 |
| Extracted at 20° C. using extruder | 84.14 | −0.48 | 36.54 |
| Extracted at 40° C. using extruder | 84.34 | −0.68 | 37.28 |

Since the products of the present invention still contained suspending component even after the centrifugation at 750 G for 10 minutes, it was confirmed that they were low in transmittance and turbid as compared with the controls. It was confirmed from a storage test that the turbid component was continued to suspend without causing precipitation even after storage for 3 months (after sterilization at 85° C. for 5 minutes, the extracted liquid was subjected to hot packaging at 80° C. in a heat-resistant PET bottle and stored while allowing to stand at 10° C., the results are shown in Table 7).

TABLE 8

|  | Transmittance at 660 nm (%) |
|---|---|
| Initial value | 65.3 |
| Stored for 1 month | 65.0 |
| Stored for 2 months | 64.8 |
| Stored for 3 months | 65.5 |
| Stored for 4 months | 64.3 |

Also, with respect to the color tone, it was confirmed that the extracted liquids had a low a-value and exhibited the original green color of green tea. With respect to the treatment time within the extruder, the treatment was carried out for a very short time of about 43 seconds in terms of an average retention time from the volume in the system of about 1.2 L, and nevertheless the extraction was carried out at an extraction temperature of 60° C. or higher as in the controls, the degree of green color was high. Also, it is considered that this is largely caused by the suspending component.

According to the sensory evaluation, it was confirmed that in particular, since the products extracted at a low temperature of not higher than 40° C. were small in the astringency derived from tannin, they retained umami and were novel so as to give a high-grade refined green tea-like flavor. Accordingly, it is desired from the viewpoint of flavor to extract the extruder-treated products at lower than 60° C., preferably not higher than 50° C., and more preferably not higher than 40° C.

Also, since it is noted from the analysis of components of the extracted liquid that the products of the present invention have a high nitrogen content as compared with the controls, it is suggested that larger amounts of amino acids such as theanine were extracted. Furthermore, it was confirmed from the analysis of the suspending component that about 0.2% of polysaccharides is contained, and therefore, it was estimated that dietary fibers that are hardly contained according to the current extraction methods were contained in the products of the present invention.

Additionally, in the Example, the centrifugation treatment was carried out at 750 G for 10 minutes. However, since the treatment is to be carried out for the purpose of removing large grounds such as used tea leaves, this treatment can be carried out under conditions lower than the above-mentioned conditions. When the conditions are properly defined with reference to the above-mentioned conditions, for example, the treatment is carried out at from 600 to 900 G for from about 1 to 30 minutes, and preferably at from 650 to 850 G for about 5 to 20 minutes. In this regard, it is possible to change the above-mentioned conditions in various ways, thereby changing the amount of the suspending component in the extracted liquid in various ways.

Example 5

A carrot was cut into a size of about 2 cm in advance and added at a rate of 4.2 kg/h from a first barrel section of a twin-screw extruder. Then, milk was added at a rate of 16.8 kg/h from a second barrel section, and the mixture was treated under the same conditions as in Examples 1 and 2 (in the same screw pattern, rotation number of screw: 220 rpm, barrel set-up temperature: 20° C.).

Shearing, kneading and emulsification proceeded due to the rotation of the screws, whereby a milky squeezed liquid could be obtained by a die outlet.

As to the flavor, the squeezed liquid sufficiently kept fragrance and flavor inherent to the carrot, in which oleophilic useful components such as β-carotene was eluted with the progress of emulsification of the milk. As a next step, the squeezed liquid was separated from squeezed grounds by filter filtration and then the oleophilic components were homogenized using a homogenizer, etc. Thus, a novel carrot juice could be obtained.

EFFECT OF THE INVENTION

The present invention has such advantages that immediately after milling a food, high-concentration extraction and/or squeezing of the food can be extremely efficiently and continuously carried out with a low-temperature solvent such as cold water by low-temperature extruder treatment; that since an extract and/or a squeezed liquid can be obtained within an extremely short time without causing substantial oxidation with air, etc., flavor and tone color that the food originally possesses are not hindered at all, thereby enabling one to industrially produce foods and drinks with the same flavor as that obtained by self-extraction in a household; and that extraction of oleophilic eluting components can be efficiently and continuously carried out by mixing and emulsification with a component such as milk, and is a truly remarkable invention.

Furthermore, as is clear from the above-mentioned Examples, the present invention is to efficiently extract and/or squeeze soluble solids from foods that are generally objective for extraction and/or squeezing, such as coffee, tea, herb tea, Chinese medical tea, fruit, and vegetable, in which the resulting extracted liquid or squeezed liquid sweeps away a conventional concept with respect to color tone, flavor, and the like, and can provide a quality attractive to consumers.

Moreover, in the tea based drinks according to the present invention, a useful component suspends over a long time of 3 months or longer, the color tone inherent to each tea, which is derived from the suspending component, is exhibited. Therefore, the tea leaves can be eaten and drunk; a conventional concept is swept away; and a quality attractive to consumers can be provided.

Consequently, it can be said that the present invention is a remarkable technology capable of giving merits to both the manufacture side and the consumer side.

The invention claimed is:

1. A process of producing an extract of coffee, which comprises charging roasted coffee beans for extraction in a twin-screw extruder having a narrow gap; milling said coffee beans, and immediately after milling, adding a low-temperature solvent from 2-30° C., followed by kneading said milled coffee beans in the solvent to thereby treat the coffee beans to extract useful components into the solvent; and optionally removing extraction grounds, wherein said milling and said extracting are carried out in the twin-screw extruder such that said milling and extracting are carried out by said twin-screw extruder.

2. The process according to claim 1, wherein the solvent is at least one member selected from the group consisting of water, milk, dairy products, sugar-containing liquids, sugar alcohol-containing liquids, mineral-containing liquids, vitamin-containing liquids, and stabilizer-containing liquids.

3. The process according to claim 1, wherein the twin-screw extruder has twin screws rotating in the same direction, and a dispersion liquid comprising the objective food and the solvent is passed through the narrow gap between the two rotating screws, followed by at least one of shearing, kneading and emulsification to thereby carry out extraction and/or squeezing into a solvent.

* * * * *